(12) United States Patent
Bliss et al.

(10) Patent No.: US 9,094,130 B2
(45) Date of Patent: Jul. 28, 2015

(54) LINEARIZATION OF OPTICAL INTENSITY MODULATION SYSTEMS

(71) Applicant: Broadcom Corporation, Irvine, CA (US)

(72) Inventors: William Bliss, Granite Canyon, WY (US); John Wang, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 97 days.

(21) Appl. No.: 14/041,949

(22) Filed: Sep. 30, 2013

(65) Prior Publication Data

US 2014/0321864 A1 Oct. 30, 2014

Related U.S. Application Data

(60) Provisional application No. 61/815,660, filed on Apr. 24, 2013.

(51) Int. Cl.
*H04B 10/04* (2006.01)
*H04B 10/54* (2013.01)

(52) U.S. Cl.
CPC .................................. *H04B 10/541* (2013.01)

(58) Field of Classification Search
CPC ...... H04B 10/54; H04B 10/541; H04B 10/50; H04B 10/505; H04B 10/516
USPC ......... 398/186, 183, 189, 192, 193, 194, 195, 398/197, 198, 135, 136, 161, 158, 159, 33, 398/38; 359/237, 238, 245, 279, 248, 254; 385/1, 2, 3
See application file for complete search history.

(56) References Cited

U.S. PATENT DOCUMENTS 6,559,996 B1 * 5/2003 Miyamoto et al. ............ 398/183
7,215,892 B2 * 5/2007 Lee et al. ...................... 398/183

* cited by examiner

*Primary Examiner* — Hanh Phan
(74) *Attorney, Agent, or Firm* — Sterne, Kessler, Goldstein & Fox, P.L.L.C.

(57) ABSTRACT

Embodiments for improving the Signal to Noise and Distortion (SINAD) ratio in Pulse Amplitude Modulation (PAM)-M optical intensity modulation systems, to enable higher data rate communications, are provided. Embodiments can be used to improve the linearity and reduce the distortion of electrical and electro-optics components (including optical modulators) in optical intensity modulation systems. Embodiments are well suited for use with PAM-M optical intensity modulators, such as segmented Vertical Cavity Surface Emitting Laser (WSEL) and segmented Mach-Zehnder Modulator (MZM), for example.

20 Claims, 5 Drawing Sheets

LINEARIZATION OF OPTICAL INTENSITY MODULATION SYSTEMS

CROSS-REFERENCE TO RELATED APPLICATIONS

The present application claims the benefit of U.S. Provisional Application No. 61/815,660, filed Apr. 24, 2013, which is incorporated herein by reference in its entirety.

BACKGROUND

1. Field of the Invention

The present disclosure relates generally to linearizing optical intensity modulation systems.

2. Background Art

Various short (e.g., <10 km) optical link applications (e.g., data center applications) use optical intensity modulation to signal information. For example, conventional systems employ two levels of optical intensity (Pulse Amplitude Modulation-2 (PAM-2)) using a signaling scheme such as Non-Return-to-Zero (NRZ), Return-to-Zero (RZ), or On-Off-Keying (OOK). While conventional systems are generally resilient to common forms of non-linearities, they generally lack the bandwidth (typically, the bandwidth is limited by electrical and electro-optical components) needed for higher data rates with PAM-2 enabling only 1 bit/Baud.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Various short link (e.g., <10 km) optical applications (e.g., data center applications) use optical intensity modulation to signal information. For example, conventional optical intensity modulation systems employ two levels of optical intensity (PAM-2) using a signaling scheme such as Non-Return-to-Zero (NRZ), Return-to-Zero (RZ), or On-Off-Keying (OOK). While generally resilient to common forms of non-linearities (e.g., distortion), conventional systems lack the bandwidth (typically, the bandwidth is limited by electrical and electro-optics components) needed for high communication data rates, with PAM-2 enabling only 1 bit/Baud.

Without resorting to more expensive (e.g., Wavelength Division Multiplexing (WDM) systems) or more complex communication systems (e.g., coherent communication systems, which additionally modulate the phase of the optical carrier), a larger number of optical intensity levels (PAM-M, M>2) is needed in order to increase data rates and enable greater than 1 bit/Baud. However, operating at higher than 1 bit/Baud generally requires greater Signal-to-Noise and Distortion (SINAD) ratio at the optical receiver. For example, PAM-4 typically requires a 7.5 dB higher average SINAD ratio than PAM-2. While the required SINAD ratio at the receiver can be decreased by using more powerful Forward Error Correction (FEC) higher coding gain), for example, such a solution comes at the expense of greater complexity and overhead.

Embodiments, as further described below, improve the SINAD ratio in PAM-M optical intensity modulation systems, to enable higher data rate communications. Specifically, embodiments can be used to improve the linearity and reduce the distortion of electrical and electro-optics components (including optical modulators) in optical intensity modulation systems to allow for systems with an increased number of optical intensity levels. Embodiments are well suited for use with PAM-M optical intensity modulators, such as segmented Vertical Cavity Surface Emitting Laser (VCSEL) and segmented Mach-Zehnder Modulator (MZM), for example. While embodiments are well suited for inexpensive short link (e.g., <10 km) optical applications, they are not limited to these applications and can also be used in long haul link applications as would be appreciated by a person of skill in the art based on the teachings herein.

Figure 1:
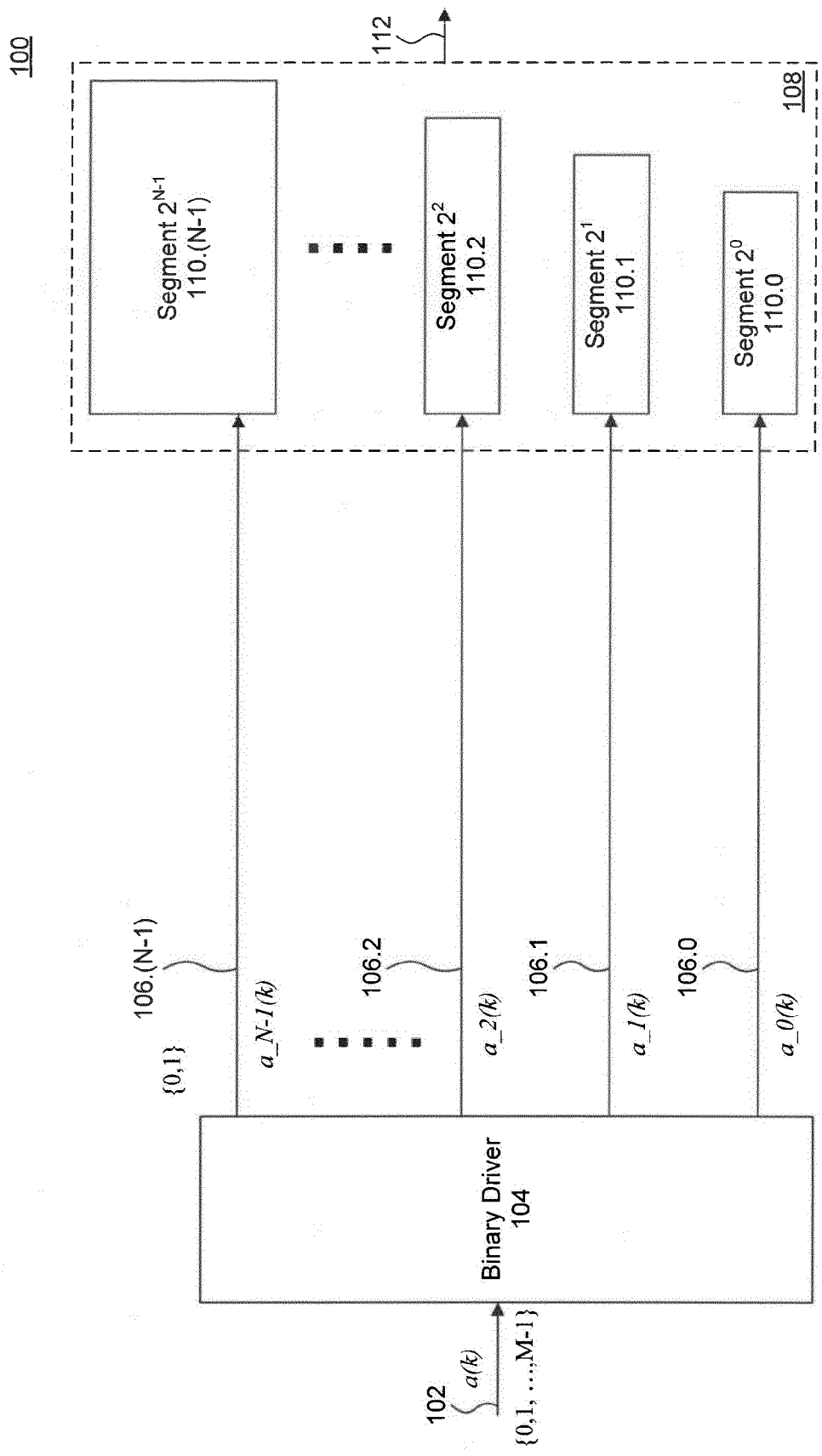
FIG. 1 illustrates an example optical intensity modulation system according to an embodiment.

FIG. 1 illustrates an example optical intensity modulation system 100 according to an embodiment. Example optical intensity modulation system 100 is provided for the purpose of illustration only and is not limiting of embodiments. Example optical intensity modulation system 100 can be located in an optical transmitter that drives a data center optical link, for example. However, embodiments are not limited to this example and may also be used in other types of applications, including short and long haul applications.

As shown in FIG. 1, optical intensity modulation system 100 includes a binary driver 104 and a segmented optical intensity modulator 108. Binary driver 104 is configured to receive a signal 102, which includes an optical amplitude logical level that represents a desired amplitude of a transmitted optical signal. In an embodiment, the optical amplitude logical level is from the range $\{0, \ldots, M-1\}$, where M is an integer greater than or equal to 2, to provide a PAM-M modulation system. In another embodiment, signal 102 can be a digital word that represents the optical amplitude logical level. Binary driver 104 converts the optical amplitude logical level to a binary representation to generate a plurality (N) of binary bits $a_0(k), \ldots, a_{N-1}(k)$. Binary bits $a_0(k), \ldots, a_{N-1}(k)$ each takes a value from the $\{0,1\}$ set. N is equal to the ceiling of $\log_2(M)$. For example, for M=5, N is equal 3.

Segmented optical intensity modulator 108 includes a plurality (N) of segments 11.0.0, ..., 110.(N-1), where N is typically greater than or equal to 2. In an embodiment, segments 110.0, ..., 110.(N-1) are configured such that their respective produced intensity levels (When switched on) are related by a power of 2 (binary) from one segment to the next ("binary power of two"). For example, a produced optical intensity level of segment 110.1 is twice a produced intensity level of segment 110.0, a produced intensity level of segment 110.2 is twice the produced intensity level of segment 110.1 (and $2^2$ or four times the produced intensity level of segment 110.0), and so on. This intensity level configuration can be controlled via geometry (e.g., segments intended to produce higher intensity can be made larger in size) or other control mechanism.

In an embodiment, segmented optical intensity modulator 108 is a segmented VCSEL. As such, each of segments 110.0, ..., 110.(N-1) can be independently switched between a high intensity level and a low intensity level. In another embodiment, segmented optical intensity modulator 108 is a segmented MZM. As such, each of segments 110.0, ..., 110.(N-1) can be independently switched between a low attenuation and a high attenuation. Other types of segmented optical intensity modulators can also be used as would be appreciated by a person of skill in the art based on the teachings herein.

In an embodiment, binary driver 104 is coupled to segmented optical intensity Modulator 108 using a plurality of transmit paths 106.0, ..., 106.(N-1), each configured to couple a respective one of the plurality of binary bits $a_0(k), \ldots, a_{N-1}(k)$ to a respective one of the plurality of segments 110.0, ..., 110.(N-1) of segmented optical intensity modulator 108. Each of the plurality of binary bits $a_0(k), \ldots, a_{N-1}(k)$ is thus configured to control an optical intensity output (e.g., switch on/off) of a respective one of the plurality of segments 110.0, ..., 110.(N-1). With the plurality of binary bits $a_0(k), \ldots, a_{N-1}(k)$ being coupled, in order of significance (from the least significant bit to the most significant bit), to segments 110.0, ..., 110.(N-1) respectively, the respective intensities produced by segments 110.0, ..., 110.(N-1) add up to result in a combined power output signal 112 that corresponds to the optical amplitude logical level, contained in signal 102. In an embodiment, binary driver 104 includes a plurality of individual bit drivers each configured to drive a respective one of the plurality of transmit paths 106.0, ... 106.(N-1).

Typically, because segments 110.0, ..., 110.(N-1) vary in size, their respective transmit paths 106.0, ..., 106.(N-1) present different electrical loading to binary driver 104. For example, segment 110.(N-1) can have higher capacitance than segment 110.0, and therefore transmit path 106.(N-1) can present higher capacitive loading to binary driver 104 than transmit path 106.0. As a result, if segments 110.0, ..., 110.(N-1) are driven uniformly (e.g., synchronously and with the same driver), they will have varying switch times with smaller segments switching on/off faster than larger segments. This mismatch causes optical intensity modulation system 100 to have a non-linear system response and results in a decrease in the SINAD ratio at the receiver. In turn, this reduces the achievable communication data rate of the system.

Figure 2:
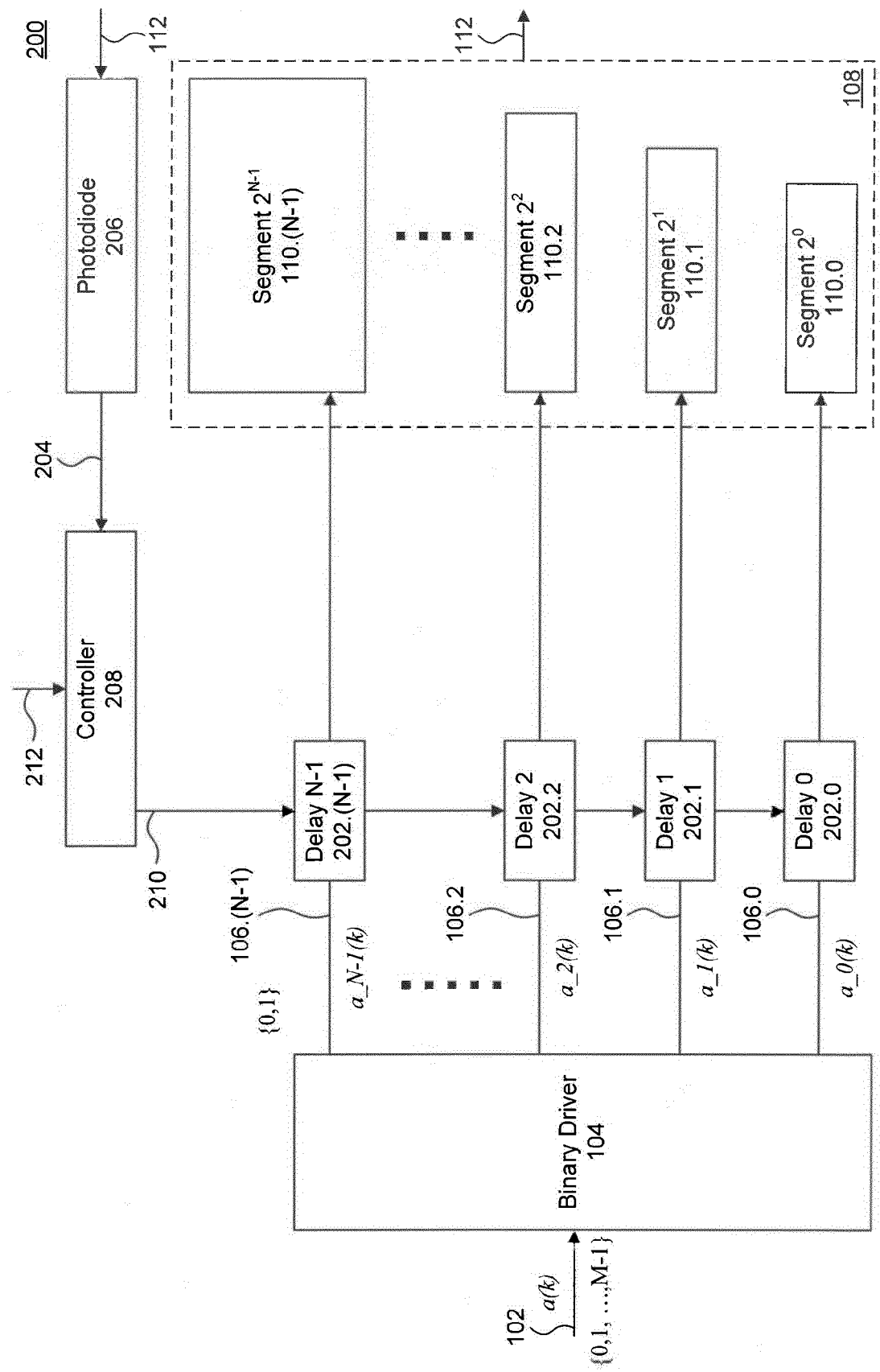
FIG. 2 illustrates another example optical intensity modulation system according to an embodiment.

FIG. 2 illustrates another example optical intensity modulation system 200 according to an embodiment. Example optical intensity modulation system 200 is provided for the purpose of illustration only and is not limiting of embodiments. Example optical intensity modulation system 200 can be located in an optical transmitter that drives a data center optical link, for example. However, embodiments are not limited to this example and may also be used in other types of applications, including short and long haul applications.

Like example optical intensity modulation system 100 described above, optical intensity modulation system 200 includes a binary driver 104, a plurality of transmit paths 106.0, ..., 106.(N-1), and a segmented optical intensity modulator 108 having a plurality of segments 110.0, ..., 110.(N-1). Additionally, transmit paths 106.0, ..., 106.(N-1) include respective programmable delay elements 202.0, ..., 202.(N-1), a photodiode 206, and a controller 208.

In an embodiment, programmable delay elements 202.2, ..., 202.(N-1) can be configured, via controller 208, to equalize the delays of transmit paths 106.0, ..., 106.(N-1) to ensure synchronous switching of segments 110.0, ..., 110.(N-1). As would be understood by a person of skill in the art based on the teachings herein, while programmable delay elements can be added into each one of transmit paths 106.0, ..., 106.(N-1), it may suffice to add programmable delay elements into a subset only of transmit paths 106A, ..., 106(N-1). for example, in an embodiment, no delay element is added into transmit path 106.(N-1) (e.g., slowest path) and programmable delay elements with progressively increasing delay values are added into transmit paths 106.N-2 to 106.0. For example, programmable delay element 202.(N-2) of transmit path 106.(N-2) can be configured to equalize the delay or compensate for a capacitive loading difference between transmit path 106.(N-2) and transmit path 106.(N-1) (e.g., the delay of programmable delay element 202.(N-2) can be set equal to a difference between an average delay of transmit path 106.(N-1) and an average delay of transmit path 106.(N-2)).

In another embodiment, programmable delay elements 202.0, ..., 202.(N-1) are added into each of transmit paths 106.0, ..., 106.(N-1), but can be disabled or bypassed if needed. Programmable delay elements 202.2, ..., 202.(N-1) can include programmable capacitors, for example, but other types of delay elements can also be used as would be understood by a person of skill in the art based on the teachings herein.

In an embodiment, the delay values of programmable delay elements 202.0, ..., 202.(N-1) are determined during a training phase at link start up. During the training, a known sequence of optical amplitude levels is transmitted by optical intensity modulation system 200. The transmitted sequence is received by a receiver (not shown in FIG. 2), coupled to optical intensity modulation system 200 via an optical link. The receiver can compute statistics based on the transmitted sequence (e.g., slicer error rate, decoder error rate, etc.) and then can determine a preferred set of delay values for programmable delay elements 202.0, ..., 202.(N-1) that enhance SINAD ratio at the receiver. In an embodiment, the receiver can calculate the delay values by performing a multi-dimensional optimization that determines delay values that minimize or reduce slicer error rate or decoder error rate, for example. Other figures of merit can also be used as would be understood by a person of skill in the art. The receiver can then convey the determined delay values to optical intensity modulation system 200 via a back-channel. In an embodiment, the determined delay values are received by controller 208 via a signal 212 from the back-channel, Controller 208 generates a control signal 210 to configure at least one of programmable delay elements 202.0, ..., 202.(N-1) in accordance with the determined delay values. In an embodiment, control signal 210 includes a plurality of control signals, one for each of programmable delay elements 202.0, ..., 202.(N-1) such that each programmable delay element can be controlled independently. Alternatively, the receiver computed statistics can be conveyed to optical intensity modulation system 200, which determines the preferred set of delays for programmable delay elements 202.0, ..., 202.(N-1).

In another embodiment, where a back-channel is not available, for example, optical intensity modulation system 200 can use photodiode 206 to receive the transmitted sequence represented by combined power output signal 112 of the plurality of segments 110.0, ..., 110.(N-1). Output 204 of photodiode 206 is then provided to controller 208, which can determine the delay values in the same manner described above and then configure at least one of programmable delay elements 202.0, ..., 202.(N-1) in accordance with the determined delay values using control signal 210. As would be understood by a person of skill in the art, when the feedback channel is local to optical intensity modulation system 200 (e.g., provided by photodiode 206), the delay values can be determined based on an information data sequence in addition to a training sequence. This allows for a slow adaptation of programmable delay elements 202.0, ..., 202.(N-1) based on changing conditions.

Figure 3:
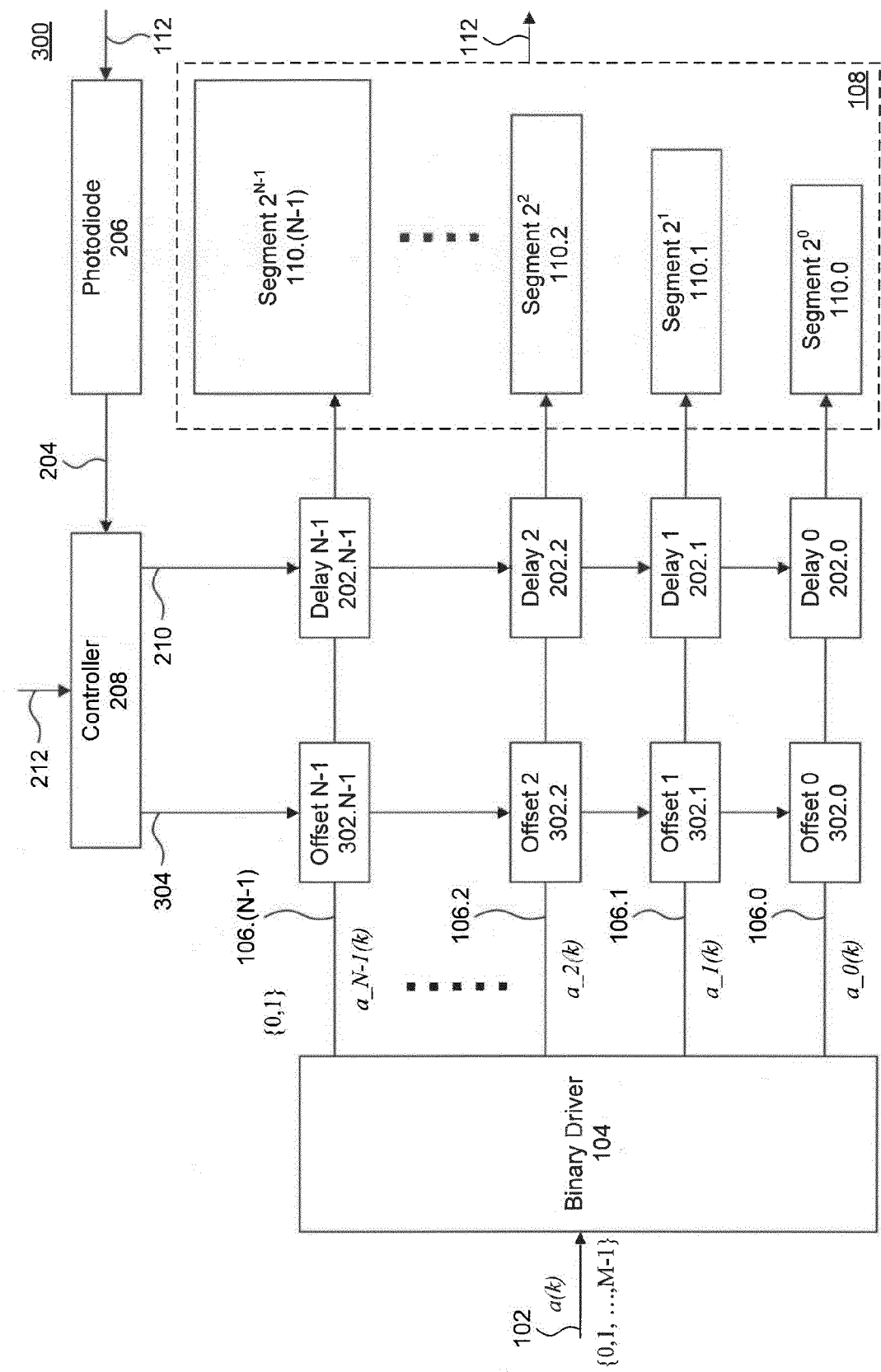
FIG. 3 illustrates another example optical intensity modulation system according to an embodiment.

FIG. 3 illustrates another example optical intensity modulation system 300 according to an embodiment. Example optical intensity modulation system 300 is provided for the purpose of illustration only and is not limiting of embodiments. Example optical intensity modulation system 300 can be located in an optical transmitter that drives a data center optical link, for example. However, embodiments are not limited to this example and may also be used in other types of applications, including short and long haul applications.

Like example optical intensity modulation system 200 described above, optical intensity modulation system 300 includes a binary driver 104, a plurality of transmit paths 106.0, ..., 106.(N-1) with respective programmable delay elements 202.0, ..., 202.(N-1), a segmented optical intensity modulator 108 having a plurality of segments 110.0, 110.(N-1), a photodiode 206, and a controller 208. Additionally, transmit paths 106.0, ..., 106.(N-1) can include respective programmable DC offset modules 302.0, ..., 302.(N-1).

In an embodiment, DC offset modules 302.0, ..., 302.(N-1) can be configured, via controller 208, to equalize the DC offsets of transmit paths 106.0, ..., 106.(N-1). Transmit paths 106.0, ..., 106.(N-1) may have different DC offsets (without compensation) due to manufacturing variations in transmit paths 106.0, ..., 106.N-1 and/or in the individual bit drivers of binary driver 104 that drive the transmit paths. DC offset equalization among transmit paths 106.0, ..., 106.(N-1) results in better linearity of optical intensity modulation system 300, further improving the SINAD ratio at the receiver and increasing the achievable data rate of the system.

As would be understood by a person of skill in the art based on the teachings herein, while DC offset modules can be added into each one of transmit paths 106.0, ..., 106.(N-1), it may suffice to add DC offset modules into a subset only of transmit paths 106.1, ..., 106.(N-1). In another embodiment, DC offset modules 302.0, ..., 302.(N-1) are added into each of transmit paths 106.0, ..., 106.(N-1), but can be disabled or bypassed if needed. In an embodiment, DC offset modules 302.0, ..., 302.(N-1) can include DC offset equalizers that can controllably add or remove DC offset to a signal.

In an embodiment, the DC offset values of DC offset modules 302.0, ..., 302.(N-1) are determined during a training phase at link start up. During the training, a known sequence of optical amplitude levels is transmitted by optical intensity modulation system 300. The transmitted sequence is received by a receiver (not shown in FIG. 3), coupled to optical intensity modulation system 300 via an optical link. The receiver can compute statistics based on the transmitted sequence (e.g., slicer error rate, decoder error rate, etc.) and then can determine a preferred set of DC offset values for DC offset modules 302.0, ..., 302.(N-1) that enhance SINAD ratio at the receiver. In an embodiment, the receiver can calculate the DC offset values by performing a multi-dimensional optimization that determines DC offset values that minimize or reduce slicer error rate or decoder error rate, for example. Other figures of merit can also be used as would be understood by a person of skill in the art. The receiver can then convey the determined DC offset values to optical intensity modulation system 300 via a back-channel. In an embodiment, the determined DC offset values are received by controller 208 via a signal 212 from the back-channel. Controller 208 generates a control signal 304 to configure at least one of DC offset modules 302.0, ..., 302.(N-1) in accordance with the determined DC offset values. In an embodiment, control signal 304 includes a plurality of control signals, one for each of DC offset modules 302.0, ..., 302.(N-1) such that each DC offset module can be controlled independently. Alternatively, the receiver computed statistics can be conveyed to optical intensity modulation system 200, which determines the preferred set of DC offset values.

In another embodiment, where a back-channel is not available, for example, optical intensity modulation system 300 can use photodiode 206 to receive the transmitted sequence represented by combined power output signal 112 of the plurality of segments 110.0, ..., 110.(N-1). Output 204 of photodiode 206 is then provided to controller 208, which can determine the DC offset values in the same manner described above and then configure at least one of DC offset modules 302.0, ..., 302.(N-1) in accordance with the determined DC offset values using control signal 304. In an embodiment, the configuration of DC offset modules 302.0, ..., 302.(N-1) is performed after programmable delay elements 202.0, ..., 202.(N-1) have been configured (to equalize delays) so that non-linearity due to DC offset variations can be identified.

In a further embodiment, controller 208 includes circuitry for measuring the DC offset of each of transmit paths 106.0, ..., 106.(N-1). Based on the measurements, controller 208 can determine the DC offset values for DC offset modules 302.0, ..., 302.(N-1) and then configure at least one of DC offset modules 302.0, ..., 302.(N-1) using control signal 304 accordingly.

Figure 4:
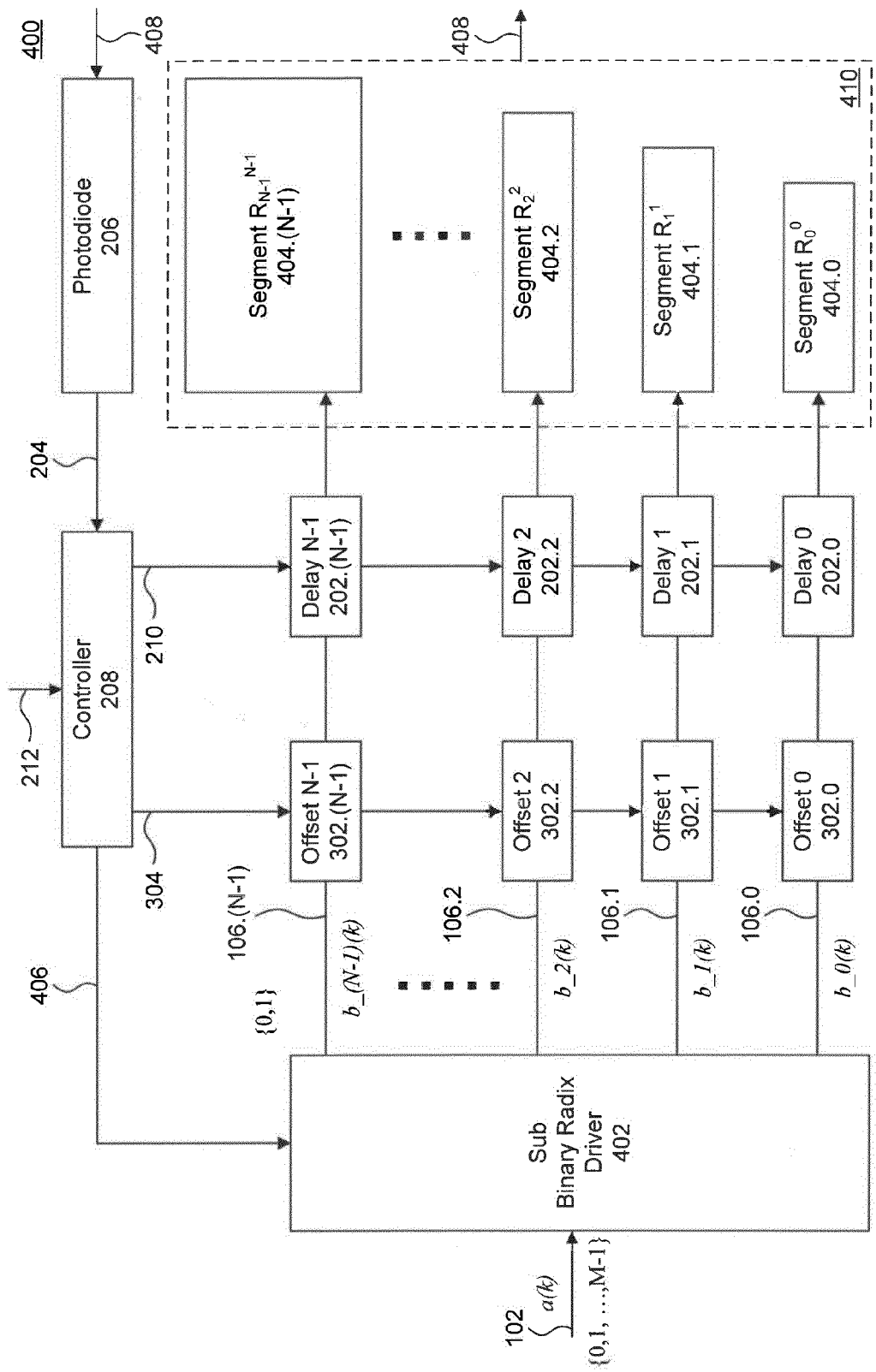
FIG. 4 illustrates another example optical intensity modulation system according to an embodiment.

While equalizing the delays and/or DC offsets of transmit paths 106.0, ..., 106.(N-1) eliminates a substantial cause of system non-linearity, another source of non-linearity can be found in optical intensity modulator 108 itself. Specifically, the "binary power of two" configuration of segments 110.0, ..., 110.(N-1) of modulator 108 assumes that the respectively produced intensity levels of segments 110.0, 110.(N-1) are related by a power of 2 (binary) from one segment to the next. However, in practice, manufacturing variations can produce a non-binary relationship, where the produced intensity level of a segment (e.g., 110.1) is more than twice the produced intensity level of its preceding segment (e.g., 110.0). This results in "holes" in the range of optical intensities that can be produced by the optical intensity modulation system (i.e., certain values within the range cannot be produced by any on/off configuration of segments 110.0, ..., 110.(N-1)). FIG. 4 described below provides an example embodiment for reducing this source of system non-linearity.

FIG. 4 illustrates another example optical intensity modulation system according to an embodiment. Example optical intensity modulation system 400 is provided for the purpose of illustration only and is not limiting of embodiments. Example optical intensity modulation system 400 can be located in an optical transmitter that drives a data center optical link, for example. However, embodiments are not limited to this example and may also be used in other types of applications, including short and long haul applications.

As shown in FIG. 4, example optical intensity modulation system 400 includes a sub-binary radix driver 402, a plurality of transmit paths 106.0, ..., 106.(N-1) with respective programmable delay elements 202.0, ..., 202.(N-1) and DC offset modules 302.0, ..., 302.(N-1), and a segmented optical intensity modulator 410 having a plurality of segments 404.0, ..., 404.(N-1), a photodiode 206, and a controller 208.

Sub-binary radix driver 402 is configured to receive a signal 102, which includes an optical amplitude logical level that represents a desired amplitude of a transmitted optical signal. In an embodiment, the optical amplitude logical level is from the range $\{0, \ldots, M\text{-}1\}$, where M is an integer greater than or equal to 2, to provide a PAM-M modulation system. In another embodiment, signal 102 can be a digital word that represents the optical amplitude logical level. Sub-binary radix driver 402 converts the optical amplitude logical level to a sub-binary representation to generate a plurality (N) of binary bits $b_0(k), \ldots, b_{N\text{-}1}(k)$. Binary bits $b_0(k), \ldots, b_{N\text{-}1}(k)$ each takes a value from the $\{0,1\}$ set. It is noted that in this embodiment N may be greater than the ceiling of $\log_2(M)$ (i.e., may be greater than the N that would be used for the same M in the embodiments using a binary driver, described above in FIGS. 1-3). This is in order to preserve the ability to represent all of the M possible input levels with a sub-binary radix representation. The number of output bits (N) is greater when smaller sub-binary radices $R_0, R_1, \ldots, R_{N\text{-}1}$ are used. In the extreme case (which corresponds to thermometer coding described below with reference to FIG. 5), the sub-binary radices $R_0, R_1, \ldots, R_{N\text{-}1}$ are equal to 1 and N=M output bits are needed to represent all of the M possible input levels.

In an embodiment, sub-binary radix driver 402 converts the optical amplitude logical level based on a sub-binary nominal radix to generate binary bits $b_0(k), \ldots, b_{N\text{-}1}(k)$. In an embodiment, the sub-binary radix is less than 2 and configured such the range of optical intensities that can be produced by system 400 contains no holes. For example, the nominal sub-binary radix can be 1.9, though other values can also be used as would be understood by a person of skill in the art based on the teachings herein. In another embodiment, the sub-binary radix of driver 402 can be programmed by controller 208.

Segmented optical intensity modulator 410 includes a plurality (N) of segments 404.0, ..., 404.N-1, where N is greater than or equal to 2. In an embodiment, segments 404.0, ..., 404.N-1 are configured such that their respective produced intensity levels (when switched on) are proportional to respective nominal sub-binary radices $R_0, R_1, \ldots, R_{N\text{-}1}$. The nominal sub-binary radices $R_0, R_1, \ldots, R_{N\text{-}1}$ can be designed to be all equal (e.g., to the nominal sub-binary radix used by driver 402) or different from each other (but all less than 2). For example, $R_0, R_1, \ldots, R_{N\text{-}1}$ can all be designed to be equal to 1.9. As such, a produced intensity level of segment 404.1 is 1.9 times a produced intensity level of segment 404.0, a produced intensity level of segment 404.2 is 1.9 times the produced intensity level of segment 404.1 (and $1.9^2$ times the produced intensity level of segment 404.0), and so on. In an embodiment, combined power output 408 is a sum of intensities produced by segments 404.0, ..., 404.N-1, and can be approximated as $b_0(k)*(R_0)^0 + b_1(k)*(R_1)^1 + b_2(k)*(R_2)^2 + \ldots + b_{N\text{-}1}(k)*(R_{N\text{-}1})^{N\text{-}1}$, where $R_0, R_1, \ldots, R_{N\text{-}1}$ represent the nominal sub-binary radices of segments 404.0, ..., 404.N-1 respectively.

As shown in FIG. 4, segments 404.0, ..., 404.N-1 are driven respectively by binary bits $b_0(k), \ldots, b_{N\text{-}1}(k)$ generated by sub-binary radix driver 402 to produce combined power output 408. With the nominal sub-binary radices being less than 2, the range of optical intensities of combined power output 408 does not contain holes, even with the presence of variations from the nominal sub-binary radices $R_0, R_1, \ldots, R_{N\text{-}1}$ of segments 404.0, ..., 404.N-1 (e.g., due to manufacturing variations, the actual weightings of segments 404.0, ..., 404.N-1 can vary from the nominal sub-binary radices $R_0, R_1, \ldots, R_{N\text{-}1}$). Instead, the nominal sub-binary radices $R_0, R_1, \ldots, R_{N\text{-}1}$ can result in a redundant number system, in which certain intensity levels can be produced using more than one configuration of binary bits $b_0(k), \ldots, b_{N\text{-}1}(k)$.

In an embodiment, the actual sub-binary radices of segments 404.0, ..., 404.N-1 can be measured at link start up. Measurements of the actual sub-binary radices can be performed by a receiver, linked to optical intensity modulation system 400, or by photodiode 206. In an embodiment, segments 404.0, ..., 404.N-1 are switched on sequentially and their respective individual power outputs are measured. The measurements are then provided/fed back to controller 208, which can use the measurements to determine the actual sub-binary radices of segments 404.0, ..., 404.N-1. Then, based on the actual sub-binary radices, controller 208 can determine an appropriate sub-binary radix for sub-binary radix driver 402 and configure sub-binary radix driver 402 accordingly via a control signal 406. In an embodiment, controller 208 determines the sub-binary radix for sub-binary radix driver 402 to ensure that the range of intensities produced by system 400 contains no holes.

Figure 5:
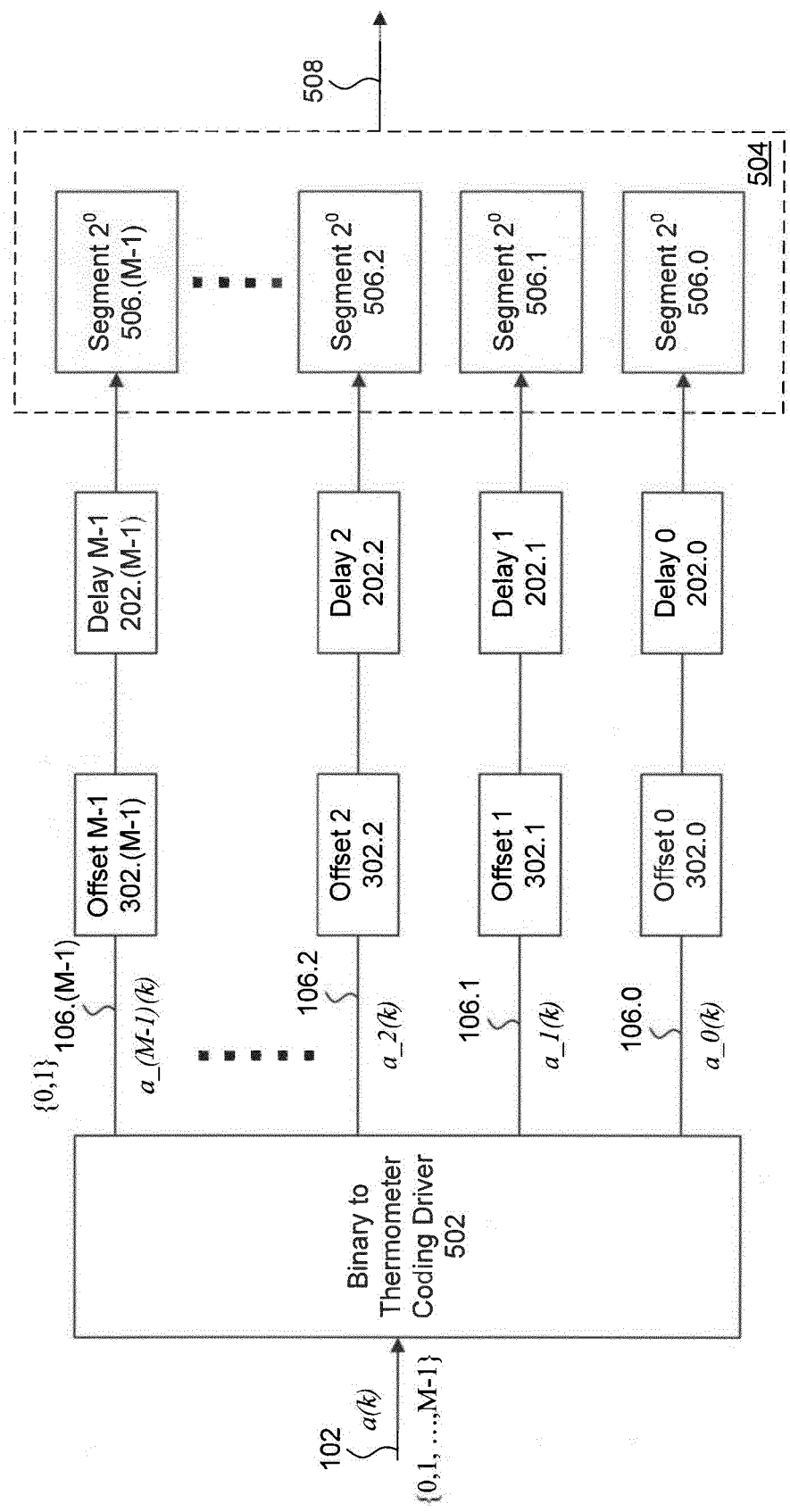
FIG. 5 illustrates another example optical intensity modulation system according to an embodiment.

FIG. 5 illustrates another example optical intensity modulation system 500 according to an embodiment. Example optical intensity modulation system 500 is provided for the purpose of illustration only and is not limiting of embodiments. Example optical intensity modulation system 500 can be located in an optical transmitter that drives a data center optical link, for example. However, embodiments are not limited to this example and may also be used in other types of applications, including short and long haul applications.

As shown in FIG. 5, example optical intensity modulation system 500 includes a binary-to-thermometer coding driver 502, a plurality of transmit paths 106.0, ..., 106.(M-1) with respective programmable delay elements 202.0, ..., 202.(M-1) and DC offset modules 302.0, ..., 302.(M-1), and a segmented optical intensity modulator 504 having a plurality of segments 506.0, ..., 506.(M-1). In another embodiment, example optical intensity modulation system 500 can also include a photodiode 206 and a controller 208 as described above with reference to FIGS. 2, 3, and 4.

Binary-to-thermometer coding driver 502 is configured to receive a signal 102, which includes an optical amplitude logical level. In an embodiment, the optical amplitude logical level is from the range $\{0, \ldots, M\text{-}1\}$, where M is an integer greater than or equal to 2, to provide a PAM-M modulation system. In another embodiment, signal 102 can be a digital word that represents the optical amplitude logical level. Driver 502 converts the optical amplitude logical level to a thermometer coding representation to generate a plurality (M) of binary bits $a_0(k), \ldots, a_{M\text{-}1}(k)$. Binary bits $a_0(k), \ldots, a_{M\text{-}1}(k)$ each takes a value from the $\{0,1\}$ set. In an embodiment, to convert the optical amplitude logical level, driver 502 is configured to set to a logic high (e.g., 1) a subset of binary bits $a_0(k), \ldots, a_{M\text{-}1}(k)$, where the size of the subset is equal to the optical amplitude logical level. All other binary bits are set to a logic low (e.g., 0). For example, if the optical amplitude logical level contained in signal 102 is equal to five, then driver 502 sets five of binary bits $a_0(k), \ldots, a_{M\text{-}1}(k)$ to 1 and the rest (M-5) of binary bits to 0. Driver 502 can randomly select the binary bits to set to 1 or can set them in order starting from $a_0(k)$ or $a_{M\text{-}1}(k)$.

Segmented optical intensity modulator 504 includes a plurality (M) of segments 506.0, ..., 506.(M-1), where M (the number of segments) is equal to a number of possible values of the range of the optical amplitude logical level. In an embodiment, segments 506.0, ..., 506.(M-1) are configured such that their respective produced intensity levels (when switched on) are equal. As shown in FIG. 5, segments 506.0, ..., 506.(M-1) are driven respectively by binary bits $a_0(k), \ldots, a_{M\text{-}1}(k)$ generated by driver 502 to produce combined power output 508.

Example system 500 can be suited for manufacturing conditions that permit close intensity matching of the segments of the segmented optical intensity modulator. In an embodiment, with the segments being closely matched to each other, they also present substantially similar electric loading to driver 502, rendering programmable delay elements 202.0, ..., 202.($2^N$-1) unnecessary.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. An optical intensity modulation system, comprising:
   a segmented optical intensity modulator having a plurality of segments;
   a binary driver configured to receive an optical amplitude level and to convert the optical amplitude level to a plurality of binary bits, wherein each of the plurality of binary bits is configured to control an optical intensity output of a respective one of the plurality of segments of the segmented optical intensity modulator; and
   a plurality of transmit paths each configured to couple a respective one of the plurality of binary bits to a respective one of the plurality of segments of the segmented optical intensity modulator,
   wherein a first transmit path of the plurality of transmit paths includes a programmable delay element configured to equalize a delay between the first transmit path and at least a second transmit path of the plurality of transmit paths.

2. The optical intensity modulation system of claim 1, wherein the first transmit path is further configured to couple a first binary bit of the plurality of binary bits to a first segment of the plurality of segments, wherein the second transmit path is further configured to couple a second binary bit of the plurality of binary bits to a second segment of the plurality of segments, and wherein a produced intensity level of the second segment is twice a produced intensity level of the first segment.

3. The optical intensity modulation system of claim 1, wherein each of the plurality of binary bits is further configured to control the optical intensity output of its respective one of the plurality of segments between a low intensity level and a high intensity level.

4. The optical intensity modulation system of claim 1, wherein the programmable delay element is further configured to compensate for a capacitive loading difference between the second transmit path and the first transmit path.

5. The optical intensity modulation system of claim 1, wherein the programmable delay element includes a capacitor.

6. The optical intensity modulation system of claim 1, wherein the first transmit path of the plurality of transmit paths further includes a DC offset module configured to equalize a DC offset between the first transmit path and at least the second transmit path of the plurality of transmit paths.

7. The optical intensity modulation system of claim 6, further comprising:
   a photo diode configured to receive a combined output of the plurality of segments; and
   a controller configured to control at least one of the programmable delay element and the DC offset module responsive to the combined output of the plurality of segments.

8. The optical intensity modulation system of claim 1, wherein a number of the plurality of segments is greater than 2.

9. The optical intensity modulation system of claim 1, wherein the segmented optical intensity modulator includes a segmented Vertical Cavity Surface Emitting Laser (VCSEL) or a segmented Mach-Zelmder Modulator (MZM).

10. An optical intensity modulation system, comprising:
    a segmented optical intensity modulator having a plurality of segments;
    sub-binary radix driver configured to receive an optical amplitude level and to convert the optical amplitude level based on a sub-binary nominal radix to a plurality of binary bits, wherein each of the plurality of binary bits is configured to control an optical intensity output of a respective one of the plurality of segments of the segmented optical intensity modulator: and
    a plurality of transmit paths each configured to couple a respective one of the plurality of binary bits to a respective one of the plurality of segments of the segmented optical intensity modulator.

11. The optical intensity modulation system of claim 10, wherein the plurality of segments include a first segment and a second segment, and wherein a produced intensity level of the second segment is equal to a product of the sub-binary nominal radix and a produced intensity level of the first segment.

12. The optical intensity modulation system of claim 10, wherein the plurality of segments include a first segment and a second segment, and wherein a produced intensity level of the first segment is proportional to a first sub-binary radix ($R_i$) and a produced intensity level of the second segment is proportional to a second sub-binary radix ($R_{i+1}$).

13. The optical intensity modulation system of claim 12, wherein the produced intensity level of the first segment is equal to $R_i^k$ and the produced intensity level of the second segment is equal to $R_{i+1}^{k+1}$, where k is an integer.

14. The optical intensity modulation system of claim 13, wherein $R_i$ and $R_{i+1}$ are equal or different.

15. The optical intensity modulation system of claim 10, further comprising:
    a photo diode configured to receive an output of at least one of the plurality of segments; and
    a controller configured to control the sub-binary nominal radix responsive to the output.

16. The optical intensity modulation system of claim 10, further comprising:

a controller configured to receive feedback from a receiver and to control the sub-binary nominal radix responsive to the feedback.

17. The optical intensity modulation system of claim 10, wherein a first transmit path of the plurality of transmit paths includes a programmable delay element configured to equalize a delay between the first transmit path and at least a second transmit path of the plurality of transmit paths.

18. An optical intensity modulation system, comprising:
a segmented optical intensity modulator having a plurality of segments of equal produced intensity levels;
a binary-to-thermometer coding driver configured to receive an optical amplitude level and to convert the optical amplitude level to a plurality of binary bits, wherein each of the plurality of binary bits is configured to control an optical intensity output of a respective one of the plurality of segments of the segmented optical intensity modulator; and
a plurality of transmit paths each configured to couple a respective one of the plurality of binary bits to a respective one of the plurality of segments of the segmented optical intensity modulator.

19. The optical intensity modulation system of claim 18, wherein the binary-to-thermometer coding driver is configured to set to a logic high a subset of the plurality of binary bits, and wherein a size of the subset is equal to the optical amplitude level.

20. The optical intensity modulation system of claim 18, wherein a number of the plurality of segments is equal to a number of possible values of the optical amplitude level.

* * * * *

UNITED STATES PATENT AND TRADEMARK OFFICE
CERTIFICATE OF CORRECTION

PATENT NO. : 9,094,130 B2  
APPLICATION NO. : 14/041949  
DATED : July 28, 2015  
INVENTOR(S) : Bliss et al.

Page 1 of 1

It is certified that error appears in the above-identified patent and that said Letters Patent is hereby corrected as shown below:

On the title page:

Item 57, Line 10. Please replace "(WSEL)" with --(VCSEL)--.

In the claims:

Column 10, Line 27. Please replace "Mach-Zelmder" with --Mach-Zehnder--.

Column 10, Line 37. Please replace "intensity,modulator:" with --intensity modulator;--.

Signed and Sealed this
Second Day of August, 2016

Michelle K. Lee
*Director of the United States Patent and Trademark Office*